US007200125B2

(12) United States Patent
Lohtia et al.

(10) Patent No.: US 7,200,125 B2
(45) Date of Patent: Apr. 3, 2007

(54) METHOD AND APPARATUS FOR DIFFERENTIATED COMMUNICATIONS IN A WIRELESS NETWORK

(75) Inventors: Anit Lohtia, Plano, TX (US); Paul Chan H. Tse, Allen, TX (US); Isa B. Atallah, Addison, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 907 days.

(21) Appl. No.: 09/976,643

(22) Filed: Oct. 12, 2001

(65) Prior Publication Data

US 2003/0072267 A1 Apr. 17, 2003

(51) Int. Cl.
*H04Q 7/00* (2006.01)
(52) U.S. Cl. .................................... 370/329; 370/335
(58) Field of Classification Search ................ 370/252, 370/328–330, 335, 335.1, 336, 412
See application file for complete search history.

(56) References Cited

U.S. PATENT DOCUMENTS

| 5,708,656 | A  | * | 1/1998  | Noneman et al. ........... 370/335 |
| 6,459,687 | B1 | * | 10/2002 | Bourlas et al. ............. 370/328 |
| 6,473,419 | B1 | * | 10/2002 | Gray et al. .................. 370/349 |
| 6,532,225 | B1 | * | 3/2003  | Chang et al. ............... 370/341 |
| 6,671,511 | B1 | * | 12/2003 | Forssell et al. .......... 455/452.1 |
| 6,683,860 | B1 | * | 1/2004  | Forssell et al. ............. 370/329 |

FOREIGN PATENT DOCUMENTS

WO    WO 00/33498    6/2000

OTHER PUBLICATIONS

Information Sciences Institute, *Internet Protocol, DARPA Internet Program Protocol Specification*, RFC 791, pp. 1-44 (Sep. 1981).
S. Deering, Network Working Group Request for Comments: 2460, *Internet Protocol, Version 6 (IPv6) Specifications*, pp. 1-33 (Dec. 1998).
European Telecommunications Standards Institute 2000, *GSM 04.60 v8.5.0, GPRS Radio Link Control/Medium Access Control (RLC/MAC)*, pp. 1-96 (1999).

* cited by examiner

*Primary Examiner*—Chau Nguyen
*Assistant Examiner*—Rhonda Murphy
(74) *Attorney, Agent, or Firm*—Trop, Pruner & Hu, P.C.

(57) ABSTRACT

In a wireless communications network, different service levels can be subscribed to by users of mobile stations for packet-switched communications, such as electronic mail, web browsing, text chat, packet-switched voice communications, and so forth. In one arrangement, two different levels are defined. For a first level, when there is no more data to send over a wireless interface between a mobile station and a wireless access system, a logical connection between the mobile station and wireless access system is released. However, at a second level, the logical connection between the mobile station and the wireless access system is not released until after a predetermined timed period from when a send buffer becomes empty, with the send buffer containing data for sending over the wireless interface. A benefit of releasing the logical connection after some predetermined wait period is that the delays associated with establishing another logical connection are reduced.

12 Claims, 3 Drawing Sheets

METHOD AND APPARATUS FOR DIFFERENTIATED COMMUNICATIONS IN A WIRELESS NETWORK

TECHNICAL FIELD

The invention relates generally to providing differentiated communications in a wireless network.

BACKGROUND

Mobile communications systems, such as cellular or personal communications services (PCS) systems, are made up of a plurality of cells. Each cell provides a radio communications center in which a mobile station establishes a call with another mobile station or wireline station connected to a public switched telephone network (PSTN). Each cell includes a radio base station, with each base station connected to a base station controller or mobile switching center that controls processing of calls between or among mobile stations or mobile stations and PSTN units.

Various wireless protocols exist for defining communications in a mobile network. One such protocol is a time-division multiple access (TDMA) protocol, such as the TIA/EIA-136 standard provided by the Telecommunications Industry Association (TIA). Another TDMA-based wireless communications technology is the Global System for Mobile (GSM) technology. According to TDMA, each radio frequency (RF) carrier carries a frame that is divided into plural time slots (or burst periods) to increase the number of mobile stations that can be supported per RF carrier.

Traditionally, wireless networks have been designed for carrying circuit-switched voice traffic. However, with the explosion of the Internet and intranets, packet-switched communications (e.g., web browsing, electronic mail, and so forth) have become common. As a result, packet-switched wireless technologies are being developed to transition to higher bandwidth and more efficient packet-switched communications of data as well as voice and other forms of real-time data over wireless networks.

Several packet-switched wireless technologies have been proposed to provide more efficient connections between a mobile station and a packet data network, such as an Internet Protocol (IP) network. One such technology is the General Packet Radio Service (GPRS) technology. One version of GPRS is adopted in GSM (Global System for Mobile) Release 1997. To provide further advanced features related to packet-switched communications, a later version of GPRS, referred to as Enhanced GPRS (EGPRS), is part of 3GPP (Third Generation Partnership Project) UMTS (Universal Mobile Telecommunication System) Release 1999 (also referred to as Release 3).

For even higher data rates, later versions of the 3GPP UMTS specification have been adopted. UMTS is based on the wideband code-division multiple access (W-CDMA) technology. In addition, an enhanced version of an Enhanced Data Rate for Global Evolution (EDGE) technology is referred to as the GSM/EDGE Radio Access Network (GE-RAN) technology.

Typically, in a wireless network capable of communicating packet-switched traffic, resources (e.g., a logical connection) are allocated to a mobile station only if there is actual data to transfer. Usually, it takes a relatively long time to allocate the resources to the mobile station. For example, in GPRS/EDGE (General Packet Radio Services/Enhanced Data Rate for Global Evolution) networks, the setup time for establishing a logical connection, referred to as a temporary block flow (TBF), can take several seconds on the uplink (from the mobile station to the radio network) and on the downlink (from the radio network to the mobile station). The demand for radio resources by multiple users (mobile stations) may exceed the amount of radio resources that are available. To enable another mobile station access to a radio network, the radio connection of a first mobile station that no longer has data to send is released, with the radio connection allocated to the other mobile station. If there is contention for radio resources among a large number of mobile stations, then overall performance for all mobile stations may suffer.

SUMMARY

In general, according to an embodiment of the invention, a method of performing communications in a wireless network comprises determining if a mobile station is subscribed to a first level of service or a second level of service. Packet-switched traffic is exchanged with the mobile station, and a logical connection between the mobile station and a wireless access system is released according to a first procedure if subscribed to the first level of service and according to a second, different procedure if subscribed to the second level of service.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
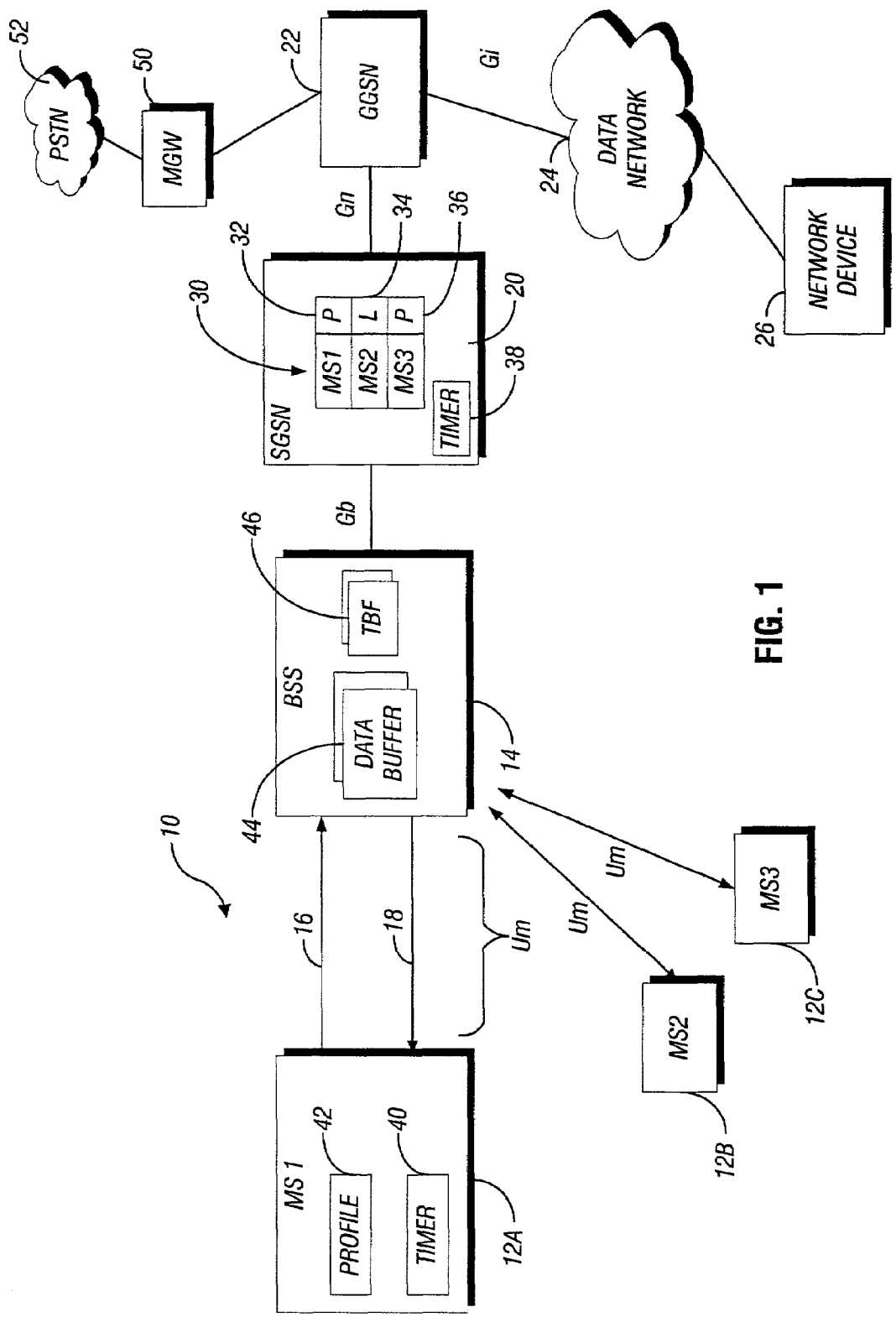
FIG. 1 is a block diagram of an embodiment of a communications system.

Referring to FIG. 1, a wireless communications network 10 includes mobile stations 12A, 12B, 12C, and a wireless access system 14 (also referred to as a "base station system or BSS"). Each mobile station 12 is capable of communicating with the wireless access system 14 over a wireless interface, which includes radio frequency (RF) links 16 (uplink) and 18 (downlink). Mobile station 12A is designated MS 1, mobile station 12B is designated MS 2, and mobile station 12C is designated MS 3.

According to one embodiment, the protocol used for communications is according to GPRS (General Packet Radio Service) or EGPRS (Enhanced GPRS) protocol. One version of GPRS is adopted in GSM (Global System for Mobile) Release 1997, while EGPRS is defined by 3GPP (Third Generation Partnership Project) UMTS (Universal Mobile Telecommunications System) Release 1999. Subsequent versions of the 3GPP UMTS specification provide for the GSM/EDGE (Global System for Mobile/Enhanced Data Rate for Global Evolution) Radio Access Network (GE-RAN) technology.

In one embodiment, the wireless interface between the mobile station 12 and the wireless access system 14 is referred to as an Um interface. In another embodiment, the interface between the mobile station 12 and wireless access system 14 is referred to as an Iu interface.

Although only one wireless access system 14 is illustrated, the wireless communications network 10 includes multiple wireless access systems. The wireless access system 14 includes a base station transceiver as well as a controller that controls various radio functions.

As used here, reference to a "wireless packet-switched communications protocol" refers to any one of the GPRS, EGPRS and GERAN protocols, as well as other packet-switched wireless protocols. Techniques and apparatus according to some embodiments of the invention can be applied or extended to other types of wireless technologies, such as the UMTS (Universal Mobile Telecommunications Systems) technology, which is based on the wideband CDMA (W-CDMA) protocol.

The base station system 14 is coupled to a serving GPRS support node (SGSN) 20 over a Gb interface, which is in turn coupled to a gateway GPRS support node (GGSN) 22. Generally, the SGSN 20 manages packet-switched communications with mobile stations within its coverage area as well as the detection of new mobile stations that have entered the coverage area. The GGSN 22 is an interface node to an external packet data network 24, such as an intranet or the Internet.

In one embodiment, the wireless access system 14, SGSN 20, and GGSN 22 make up some of the components of a "core network" that enables packet-switched communication between a mobile station 12 and another endpoint, such as another mobile station, a device 26 coupled to the packet data network 24, or alternatively, a circuit-switched network (e.g., PSTN) 52 through a media gateway 50. According to some embodiments, packet-switched communications is according to the Internet Protocol (IP). A version of IP, referred to as IPv4, is described in Request for Comments (RFC) 791, entitled "Internet Protocol," dated September 1981. Another version of IP is IPv6, which is described in RFC 2460, "Internet Protocol, Version 6(IPv6) Specification," dated December 1998.

Examples of packet-switched communications include electronic mail, web browsing, voice over-IP, text chat, and so forth. In packet-switched communications, data is carried in packets across the communications links. Each packet is routed based on a network address (of the destination device) carried in the header of the packet, such as an IP header in an IP packet.

In accordance with some embodiments of the invention, a mechanism provided in each mobile station 12 and the SGSN 20 enables differentiated service for different mobile stations subscribed to different service levels. For example, mobile stations 12A and 12C are subscribed to a "premium" or higher level of service, while mobile station 12B is subscribed to a "standard" level of service. Premium users are typically charged a higher rate (e.g., higher monthly access fee or higher rate per predefined unit of use), while standard users are typically charged a lower effective rate. As another example, a premium user may be one that signs a longer subscription contract. Mobile stations of premium users are provided a higher level of service for packet-switched communications. In further embodiments, additional levels of service can be defined.

In a wireless communications system such as a GPRS, EGPRS, or GERAN system, a temporary block flow (TBF) is established either on the uplink 16 or the downlink 18 (depending on which of the peer entities is initiating the control signaling or data transfer) to communicate signaling and user data between the mobile station 12 and the base station system 14. The data communicated between the mobile station 12 and the base station system 14 according to EGPRS are carried in logical link control (LLC) protocol data units (PDUs) on packet data channels (PDCHs). Each TBF is allocated radio resources on one or more PDCHs and includes a number of RLC/MAC (radio link control/medium access control) blocks carrying one or more LLC PDUs. A TBF is temporary and is typically maintained for the duration of a data transfer (until there are no more RLC/MAC blocks to be transmitted and, in RLC acknowledged mode, all of the transmitted RLC/MAC blocks have been successfully acknowledged by the receiving entity).

A physical channel (e.g., a time slot of a frame) in the wireless interface can be shared by multiple mobile stations 12 for packet-switched communications. The multiple mobile stations 12 are concurrently assigned to the physical channel. However, only one of the multiple mobile stations is able to communicate over the physical channel at any given time. A TBF is assigned to one of the mobile stations to enable the transfer of data the transfer of the desired data.

The RLC layer defines procedures for segmentation and reassembly of LLC PDUs into RLC/MAC blocks, in addition to other tasks. The MAC layer defines the procedures that enable multiple mobile stations to share a common transmission medium, which includes several physical channels. In addition, the MAC layer defines procedures to support the provision of TBFs that allow the point-to-point transfer of signaling and user data between the mobile station and the base station system.

More generally, each TBF established on either the uplink 16 or the downlink 18 between the mobile station 12 and the base station system 14 is referred to as a "logical connection." The establishment and release of such a logical connection is controlled by a logical connection control module in the mobile station 12 and a logical connection control module in the base station system 14. Although referred to as a single element, each logical connection control module can actually include plural components, including components in the RLC and MAC layers of each of the mobile station 12 and base station system 14.

For mobile stations of premium subscribers, release of the TBF is delayed even after there is no more data to send. In a conventional GPRS or EGPRS system, the procedure to initiate release of the TBF will occur as soon as the first burst is completed (that is, the last data block of the burst has been transmitted). When a subsequent burst is to be transmitted, a new TBF will have to be established. Due to the relatively large amount of time needed to establish a TBF, the premature release of a TBF can lead to inefficient packet-switched communications. Such a conventional release mechanism can still be employed for mobile stations of standard subscribers in accordance with some embodiments of the invention.

However, for premium subscribers, instead of starting a procedure to release the logical connection as soon as it is detected that the RLC/MAC send buffer of the mobile station 12 is empty, a predetermined wait period is provided by a timer 40 before the release procedure is started. Thus, even though the RLC/MAC send buffer in the mobile station 12 is empty, the logical connection on the uplink 16 is maintained for the predetermined wait period set by the timer 40. The content of the timer 40 can be preprogrammed in the mobile station, or alternatively, the timer 40 can be programmed by the wireless network (such as being based on subscription level). If there is additional data to be transferred (such as data in the next burst) before expiration of the timer 40, the data transfer can bypass the signaling procedure to establish a logical connection and start the data transfer faster. Since it is the logical connection (e.g., TBF) that is being maintained, no physical radio resources (e.g., a time slot of a frame of a carrier) are wasted. The mobile station 12 is aware of its premium subscription level based on a profile 42 maintained in the mobile station.

For the downlink 18, the downlink TBF between the base station system 14 and a mobile station 12 associated with a premium subscriber is also not released until after a predetermined delay. In one embodiment, this is accomplished by the SGSN 20 determining when a send buffer 44 (for the mobile station) is about to become empty and to send "dummy" or filler packets once that occurs to prevent the release of the downlink TBF by the base station system 14. The filler packets contain a predetermined header so that the receiving mobile station 12 knows to discard the packets. As shown in FIG. 1, the base station system 14 includes plural data buffers 44 each associated with different downlink TBFs 46 for different mobile stations 12.

In the SGSN 20, a profile database 30 contains various entries 32, 34, and 36 for respective mobile stations 12A, 12B, and 12C (MS 1, MS 2, MS 3). Each mobile station is associated with a subscription level, with "P" representing a premium subscription level and "L" representing a standard level.

Figure 2:
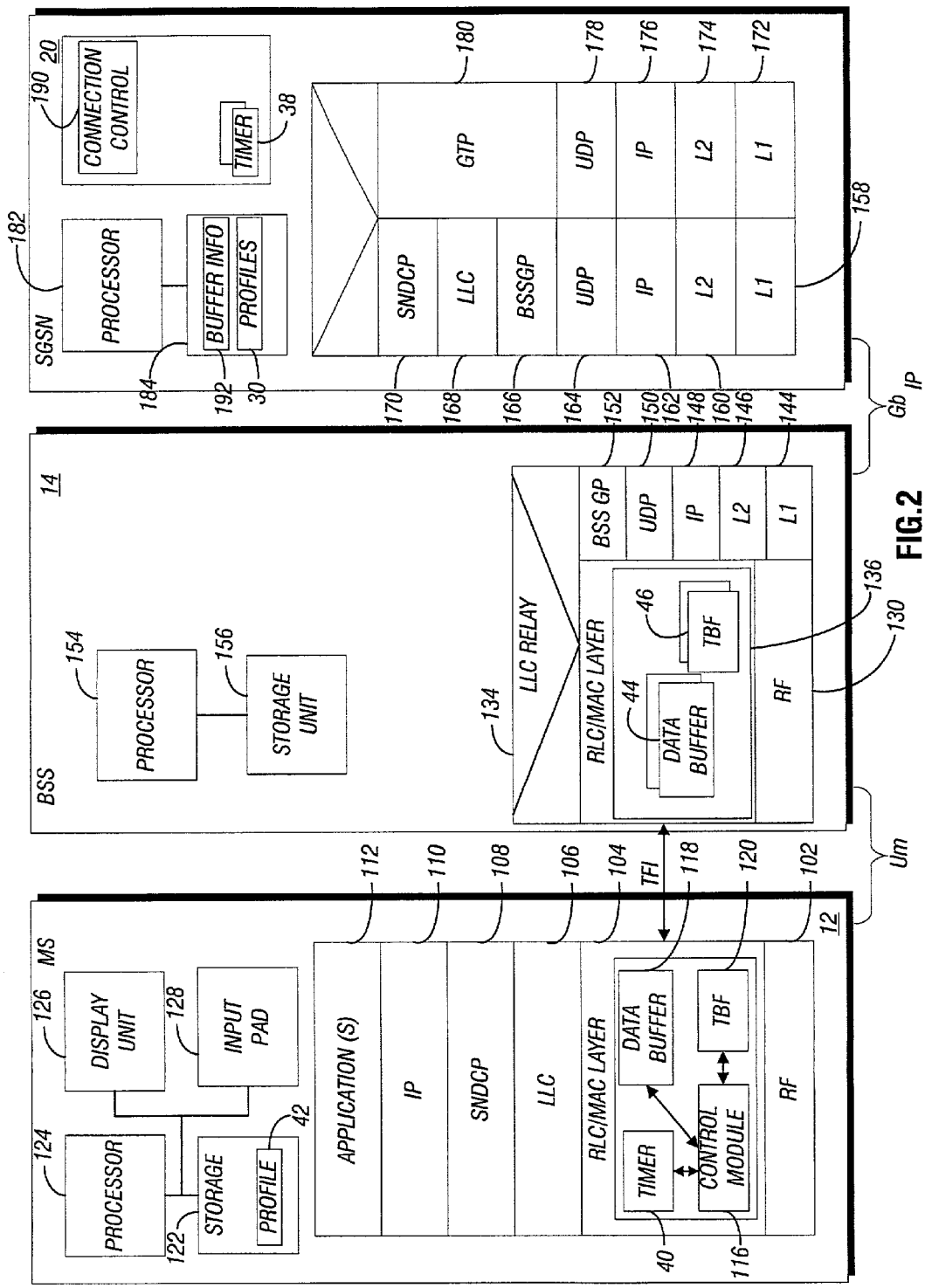
FIG. 2 is a block diagram of components in a mobile station, base station system, and serving General Packet Radio Service (GPRS) support node (SGSN) in the communications system of FIG. 1.

Referring to FIG. 2, components in the mobile station 12, base station system 14, and SGSN 20 according to one example arrangement are illustrated. The mobile station 12 includes a radio frequency (RF) transceiver 102 for communicating RF signals with the base station system 14. Hierarchically above the RF transceiver 102 is the RLC/MAC layer 104.

In one example embodiment, the RLC/MAC layer 104 includes a control module 116, the timer 40, a send data buffer 118, and a storage element 120 (e.g., a memory device in the mobile station 12) to store the uplink TBF state. The control module 116 manages the establishment and release of the uplink TBF. The uplink TBF is initiated or established when there is data to send in the send data buffer 118. Each TBF is assigned a TFI. The uplink TBFs of different mobile stations are assigned different TFIs. The uplink TBF is released when there are no more data to send in the data buffer 118. When a TBF and associated TFI is released, the TBF can be assigned for communication with another mobile station. The timer 40 provides a delay period for starting the procedure to release the uplink TBF after the data buffer 118 has emptied (or no longer contains data for transmission over the TBF), if the profile 42 of the mobile station 12 indicates a premium level of subscription. The profile 42 can be stored in a storage 122 of the mobile station 12.

Above the RLC/MAC layer 104 is the logical link control (LLC) layer 106. The LLC layer 106 provides a reliable logical link between the mobile station 12 and the SGSN 20. The LLC layer 106 provides services necessary to maintain a ciphered data link between the mobile station 12 and the SGSN 20. In addition, the LLC layer 106 supports procedures for point-to-point and point-to-multipoint delivery of LLC PDUs, procedures for detecting and recovery lost or corrupted LLC PDUs, and procedures for flow control of LLC PDUs between the mobile station 12 and SGSN 20. The LLC layer 106 uses a temporary logical link identity (TLLI) for addressing.

The mobile station 12 also includes a subnetwork data conversion protocol (SNDCP) layer 108 situated above the LLC layer 106. The SNDCP layer 108 manages the transmission and reception of NS-PDUs between the mobile station 12 and the SGSN 12. In addition, an IP layer 110 (or alternatively, another type of packet data protocol or PDP layer) is provided to enable IP (or other packet-switched) communications through the wireless infrastructure, including the base station system 14, SGSN 20, and GGSN 22. A transport layer (not shown), such as a UDP (User Datagram Protocol) layer, is also provided above the IP layer 110. In addition, application routines or modules 112 are provided in the mobile station 12. As examples, such application routines or modules 112 include web browsers, e-mail applications, text chat applications, voice communications applications, and so forth.

Various software routines or modules in the mobile station 12, including the layers 104, 106, 108, 110, and 112, are executable on a processor (or plural processors) 124 in the mobile station 12. The processor 124 is coupled to the storage 122, which is capable of storing data and instructions. A display unit 126 is provided in the mobile station 12 to display messages and other textual or graphical data. An input pad 128 (such as a numeric keypad) is provided to enable entry of user selections or commands.

The base station system 14 includes a number of layers to interface to the several layers of the mobile station 12. The base station system 14 also includes an RF transceiver 130 and an RLC/MAC layer 136. The data buffers 44 and TBF states 46 are stored in the RLC/MAC layer 136. Multiple TBFs 46 are maintained for different mobile stations. For a given time slot on a carrier (having a frequency), a number (e.g., 16 or 32) of TFIs can be associated with plural mobile stations to enable sharing of the time slot (or channel). Communications with each of the mobile stations occurs over different TBFs assigned respective unique TFIs.

The base station system 14 also includes an LLC relay layer 134, which forwards LLC PDUs to the Gb interface stack made up of layers 144, 146, 148, 150, and 152. The Gb interface stack includes a lower physical layer (L1 layer) 144. In addition, an L2 layer 146 (or the data link layer) is provided above the L1 layer 144. Above the L2 layer 146 is an IP layer 148 to enable IP communications over the Gb interface between the base station system 14 and the SGSN 20.

A transport layer (e.g., a UDP layer) 150 is provided above the IP layer 148. The layer above the UDP layer 150 is a BSSGP (Base Station System GPRS Protocol) layer 152. One function of the BSSGP layer 152 is to provide radio-related, QoS, and routing information used to transmit user data between the BSS 14 and the SGSN 20.

The Gb interface shown in FIG. 2 is a $Gb_{IP}$ layer, which is adapted to perform IP-based communications over the link with the SGSN 20. However, in another embodiment, instead of a $Gb_{IP}$ interface, a Frame Relay-based Gb interface can be employed. In a Frame Relay link, virtual connections or circuits are established between the base station system 14 and the SGSN 20 for communicating data. For the Frame Relay-based Gb interface, the IP and UDP layers 148 and 150 are replaced with a Frame Relay layer.

The various software routines or modules in the base station system 14, including the layers 146, 148, 150, and 152 are executable on a processor (or plural processors) 154 in the base station system 14. The processor 154 is coupled to a storage 156 for storing data and instructions.

The SGSN 20 includes protocol layers that communicate over the Gb interface with the base station system 14. The SGSN 20 includes an L1 layer 158, an L2 layer 160, an IP layer 162, a UDP layer 164, and a BSSGP layer 166. In addition, the SGSN 20 includes an LLC layer 168 and an SNDCP layer 170.

The SGSN 20 routes data received over the Gb interface to the Gn interface (and vice versa). The Gn interface similarly includes an L1 layer 172, an L2 layer 174, an IP layer 176, and a UDP layer 178. In addition, the Gn interface includes a GPRS Tunneling Protocol (GTP) layer 180 that manages the tunneling of signaling and data between the SGSN 20 and the GGSN 22. The various software routines of the SGSN 20 are executable on a processor (or plural processors 182), which is coupled to a storage 184.

The profile database 30 is stored in the storage 184. As discussed above, the profile database 30 contains the subscriber service level for each of multiple mobile stations 12 that are within the coverage area of the SGSN 20. Alternatively, the profile database 30 is stored in a node separate from the SGSN 20.

Information 192 pertaining to the send data buffer 44 in the base station system 14 is also stored in the storage 184. The buffer information 192 includes the size of the send data buffer 44 as well as the leaky rate from the send date buffer 44 on the downlink 18. The information 192 can include buffer information for multiple send buffers in the base station system 14.

The SGSN 20 also includes a connection control software mobile 190 that is responsible for determining the service level of given mobile station, and if the service level is a premium service level, to send filler data if the connection control module 190 determines that the send buffer 44 is about to become empty.

Figure 3:
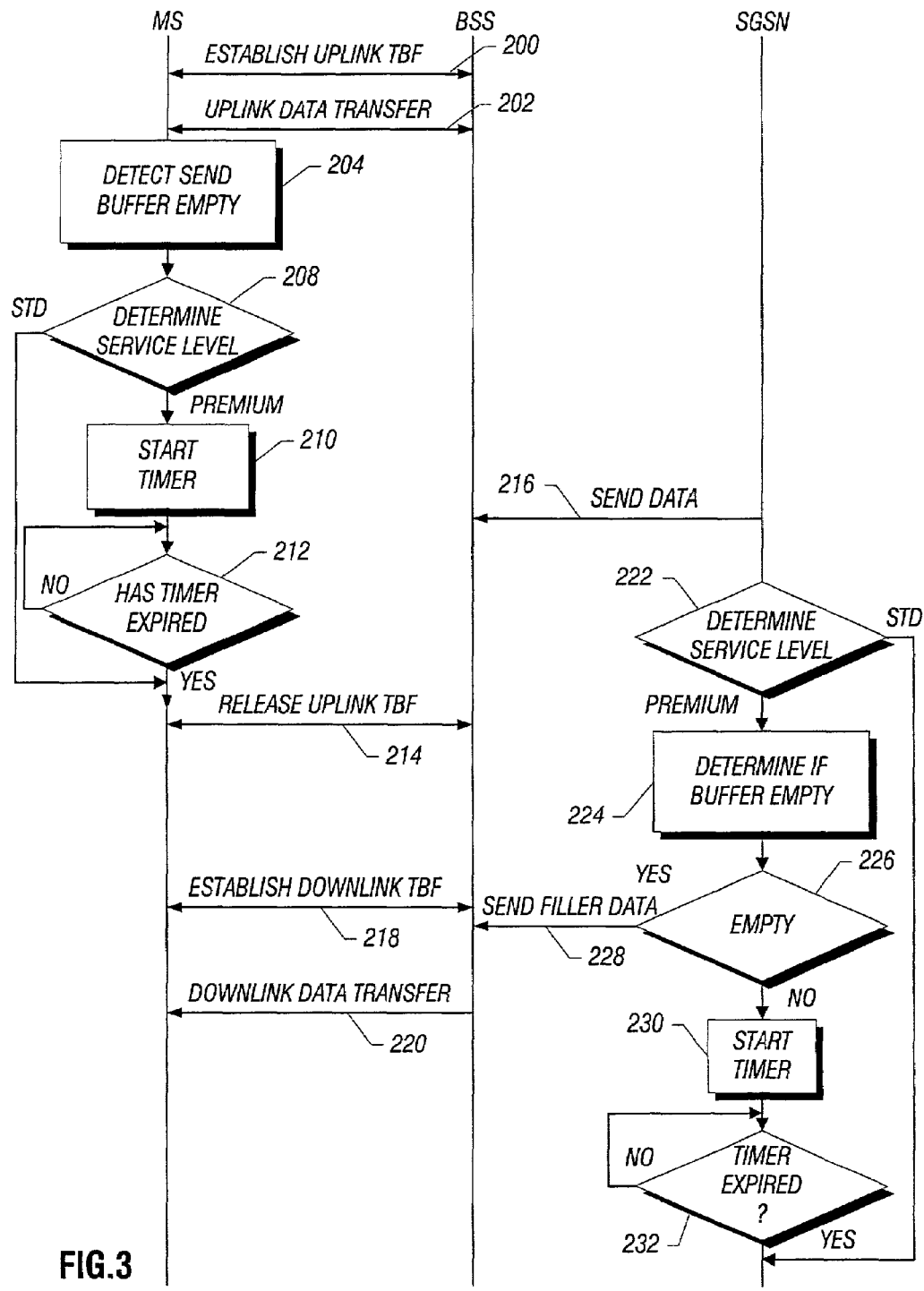
FIG. 3 is a message flow diagram of messages exchanged between a mobile station, base station system, and SGSN.

Referring to FIG. 3, a flow diagram of communications involving a mobile station 12, a base station system 14, and the SGSN 20 is illustrated. Assuming that the mobile station 12 wishes to send data on the uplink, the mobile station 12 initiates the establishment of an uplink TBF (at 200). The uplink TBF can be established in a number of ways, such as by use of any one of the following procedures: a two-phased access procedure, a one-phased access procedure, a short-phased access procedure, and so forth. In one embodiment, the mobile station sends a PACKET CHANNEL REQUEST message over a packet random access channel (PRACH) to the base station system 14. PRACH is a control channel used to request access to the network. After further exchanges of control messages between the mobile station and the base station system 14, the uplink TBF is established. Uplink data transfer can then be performed (at 202). The data to be transmitted over the wireless interface on the uplink is stored in the send data buffer 118 (FIG. 2).

The mobile station 12 detects for the send buffer being empty condition or other condition reflecting end of data transmission (at 204). If it detects that the send buffer 118 is empty or other condition indicating end of data transmission, the mobile station 12 determines (based on the profile 42 stored in the storage 122) the service level subscribed to by the mobile station 12 (at 208). If the service level subscribed to is the standard service level, then the mobile station initiates an exchange of messages to release the uplink TBF (at 214). However, if the mobile station 12 determines the service level subscribed to is the premium service level, than the mobile station 12 starts (at 210) the timer 40. The mobile station waits (at 212) for the timer 40 to expire. Once the timer 40 expires, the uplink TBF is released (at 214).

When the SGSN 20 receives data to transmit to the mobile station 12 (such as from a device coupled to the data network 24, the media gateway 50, or another mobile station), the SGSN 20 sends (at 216) data to the base station system 14. The base station system 14 then initiates (at 218) the establishment of a downlink TBF with the mobile station 12. Once the downlink TBF is established, the base station system 14 performs a downlink data transfer (at 220) with the mobile station 12.

In the meantime, the SGSN 20 (the connection control module 190) determines the subscribed service level of the mobile station that the SGSN is sending data to. If the SGSN 20 determines that the subscribed service level is the premium service level, the SGSN 20 determines (at 224) if the send buffer 44 in the base station system 14 is empty or is about to become empty. The SGSN 20 determines (at 224) whether the send buffer is empty or is about to be emptied based on the amount of data that is initially in the send buffer 44 (data that was transmitted by the SGSN 20 at 216), the size of the buffer 44, and the leaky rate of the send buffer 44 (stored as buffer information 192). Note that in one embodiment, the SGSN 20 does not actually know if the send buffer 44 is actually empty. Instead, in this embodiment, the SGSN 20 estimates when the send buffer 44 is about to be empty based on characteristics of the send buffer 44 and the amount of data to be communicated. If the SGSN 20 determines (at 226) that the send buffer 44 is empty or is about to be empty, the SGSN 20 sends (at 228) filler data to the base station system 14, which fills up the send buffer 44. Note that if at any time, actual data is to be transmitted by the SGSN 20, the actual data is sent instead of the filler data.

The SGSN 20 also starts (at 230) the timer 38. As long as the timer 38 has not expired (as determined at 232), the SGSN 20 continues to send filler data to fill the send buffer 44 in the base station system 14. Since the send buffer 44 remains filled with data to send, the base station system 14 does not release the downlink TBF with the premium service level mobile station.

In another embodiment, the enhanced service level can be provided on one of the uplink and downlink (not both) for mobile stations that have subscribed to a premium level of service.

The various software layers, routines, or modules described herein may be executable on various processing elements, such as processors discussed above. Each processor may include a microprocessor, a microcontroller, a processor module (including one or more microprocessors or microcontrollers), or other control or computing devices. As used here, a "controller" can refer to either hardware or software or a combination of the two. A "controller" can also refer to a single component or to plural components (either hardware or software).

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective processor cause the corresponding node or system to perform programmed acts.

The instructions of the software routines, modules, or layers are loaded or transported to each node or system in any of a variety of different ways. For example, code segments including instructions stored on floppy disks, CD or DVD media, a hard disk, or transported through a network interface card, modem, or other interface device are loaded into the device or system and executed as corresponding software routines, modules, or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefore. It is intended that the appended claims cover such modifications and variations as fall within the true spirit and scope of the invention.

What is claimed is:

1. A method of performing communications in a wireless network, comprising:
   determining, based on a profile associated with a subscriber, if the subscriber is subscribed to a first level of service or a second level of service;
   communicating packet-switched traffic; and
   releasing a logical connection between a mobile station associated with the subscriber and a wireless access system according to a first procedure if subscribed to the first level of service and according to a second, different procedure if subscribed to the second level of service,
   wherein the first procedure comprises starting a timer in the mobile station after detecting there is no further data to send, and releasing the logical connection after expiration of the timer, and
   wherein the second procedure comprises releasing the logical connection without starting the timer and without waiting for expiration of the timer.

2. The method of claim 1, wherein determining that the subscriber is subscribed to the first level of service comprises determining that the subscriber is a premium subscriber, and wherein determining that the subscriber is subscribed to the second level of service comprises determining that the subscriber is a standard subscriber.

3. A method of performing communications in a wireless network, comprising:
   determining if a mobile station is subscribed to a first level of service or a second level of service;
   communicating packer-switched traffic; and
   releasing a logical connection between the mobile station and a wireless access system according to a first procedure in response to determining that the mobile station is subscribed to the first level of service and according to a second, different procedure in response to determining that the mobile station is subscribed to the second level of service,
   wherein the first procedure comprises starting a timer in the mobile station after detecting there is no further data to send, and releasing the logical connection after expiration of the timer, and
   wherein the second procedure comprises releasing the logical connection without starting the timer and without waiting for expiration of the timer.

4. The method of claim 3, wherein the determining, communicating, and releasing acts are performed by the mobile station.

5. The method of claim 3, wherein releasing the logical connection comprises releasing a temporary block flow.

6. The method of claim 5, wherein releasing the temporary block flow comprises releasing an uplink temporary block flow.

7. The method of claim 5, wherein communicating the packet-switched traffic comprises carrying the packet-switched traffic in one or more channels defined by a protocol selected from the group consisting of a General Packet Radio Service (GPRS) protocol, an Enhanced GPRS protocol, and a Global System for Mobile/Enhanced Data Rate for Global Evolution Radio Access Network (GERAN) protocol.

8. The method of claim 3, wherein detecting there is no further data to send is performed by detecting if a send buffer is empty or is about to become empty.

9. A mobile station associated with a subscriber, comprising:
   an interface block to a wireless link to a wireless access system;
   a storage to store a profile indicating a subscription level of the subscriber;
   a controller to determine, based on the stored profile, if the subscriber is subscribed to a first level of service or a second level or service,
   the controller to release a temporary block flow on the wireless link according to a first procedure if subscribed to the first level of service and according to a second, different procedure if subscribed to the second level of service,
   wherein the first procedure comprises starting a timer in the mobile station after detecting there is no further data to send, and releasing the temporary block flow after expiration of the timer, and
   wherein the second procedure comprises releasing the temporary block flow without starting the timer and without waiting for expiration of the timer.

10. The mobile station of claim 9, wherein the first level of service corresponds to the subscriber being a premium subscriber, and wherein the second level of service corresponds to the subscriber being a standard subscriber.

11. A mobile station comprising:
    an interface block to a wireless link to a wireless access system; and
    a controller to:
      determine if the mobile station is subscribed to a first level of service or a second level of service;
      release a temporary block flow between the mobile station and the wireless access system according to a first procedure in response to determining that the mobile station is subscribed to the first level of service; and
      release the temporary block flow between the mobile station and the wireless access system according to a second, different procedure in response to determining that the mobile station is subscribed to the second level of service,
    wherein the first procedure comprises starting a timer in the mobile station after detecting there is no further data to send, and releasing the temporary block flow after expiration of the timer, and
    wherein the second procedure comprises releasing the temporary block flow without starting the timer and without waiting for expiration of the timer.

12. The mobile station of claim 11, wherein the temporary block flow is defined by a packer-switched wireless protocol selected from the group consisting of a General Packet Radio Service protocol, an Enhanced General Packet Radio Service protocol, and a Global System for Mobile/Enhanced Data Rate for Global Evolution Radio Access Network protocol.

* * * * *